(12) United States Patent
Craven et al.

(10) Patent No.: US 9,506,722 B2
(45) Date of Patent: Nov. 29, 2016

(54) VIEWING APPARATUS

(71) Applicant: Nitesite Ltd., York (GB)

(72) Inventors: David Craven, York (GB); Philip Craven, York (GB)

(73) Assignee: Nitesite Ltd., York (GB)

( * ) Notice: Subject to any disclaimer, the term of this patent is extended or adjusted under 35 U.S.C. 154(b) by 0 days.

(21) Appl. No.: 14/868,899

(22) Filed: Sep. 29, 2015

(65) Prior Publication Data

US 2016/0018190 A1 Jan. 21, 2016

Related U.S. Application Data

(63) Continuation of application No. 13/509,777, filed as application No. PCT/GB2011/051031 on Jun. 1, 2011, now Pat. No. 9,322,616.

(30) Foreign Application Priority Data

Jun. 18, 2010 (GB) .................................. 1010207.7

(51) Int. Cl.
| | |
|---|---|
| *F41G 1/36* | (2006.01) |
| *F41G 1/32* | (2006.01) |
| *F41G 1/38* | (2006.01) |
| *F41G 3/16* | (2006.01) |
| *G03B 29/00* | (2006.01) |
| *H04N 5/33* | (2006.01) |
| *H04N 5/225* | (2006.01) |
| *H04N 5/232* | (2006.01) |
| *H04N 7/18* | (2006.01) |

(52) U.S. Cl.
CPC . *F41G 1/32* (2013.01); *F41G 1/38* (2013.01); *F41G 3/165* (2013.01); *G03B 29/00* (2013.01); *H04N 5/2256* (2013.01); *H04N 5/23293* (2013.01); *H04N 5/33* (2013.01); *H04N 7/185* (2013.01)

(58) Field of Classification Search
CPC .............. F41G 1/00; F41G 1/32; F41G 1/34; F41G 1/35; F41G 1/36
USPC .............................. 42/90, 119, 124, 111, 130
See application file for complete search history.

(56) References Cited

U.S. PATENT DOCUMENTS

| | | | | |
|---|---|---|---|---|
| 4,835,621 A * | 5/1989 | Black | ........................ | F41J 5/10 352/95 |
| 6,000,163 A * | 12/1999 | Gordon | .................. | G03B 29/00 352/84 |
| 6,070,355 A * | 6/2000 | Day | ........................ | F41C 27/00 42/106 |
| 6,237,462 B1 * | 5/2001 | Hawkes | .................. | F41A 23/12 89/37.05 |
| 6,269,730 B1 * | 8/2001 | Hawkes | .................... | F41G 5/06 89/41.05 |
| 6,363,223 B1 * | 3/2002 | Gordon | .................. | F41A 33/00 348/61 |
| 6,543,173 B1 * | 4/2003 | Golan | ..................... | F41A 19/09 42/75.04 |
| 6,813,025 B2 * | 11/2004 | Edwards | .................. | F41G 1/38 356/422 |

(Continued)

*Primary Examiner* — Jonathan C Weber
(74) *Attorney, Agent, or Firm* — Coats & Bennett, P.L.L.C.

(57) ABSTRACT

A viewing apparatus for a rifle scope, the viewing apparatus comprising a camera unit having a camera and attachment means operable to attach the camera unit to a rifle scope such that the camera is exposed to an image visible at an eyepiece of a rifle scope, the camera being adapted to generate image data from the image to which it is exposed, the camera unit being arranged and operable to transfer the image data from the camera to a display unit, the display unit comprising display means being arranged and operable to display the image data received from the camera unit, the display unit further comprising attachment means operable to attach the display unit to a rifle scope.

14 Claims, 2 Drawing Sheets

(56) References Cited

U.S. PATENT DOCUMENTS

| | | | | |
|---|---|---|---|---|
| 6,886,287 B1* | 5/2005 | Bell | F41G 11/001 | |
| | | | 33/334 | |
| 7,121,036 B1* | 10/2006 | Florence | F41A 17/08 | |
| | | | 42/111 | |
| 7,124,531 B1* | 10/2006 | Florence | F41A 17/08 | |
| | | | 42/111 | |
| 7,210,262 B2* | 5/2007 | Florence | F41G 1/32 | |
| | | | 42/132 | |
| 7,333,270 B1* | 2/2008 | Pochapsky | F41G 1/32 | |
| | | | 250/330 | |
| 7,335,026 B2* | 2/2008 | Goree | F41A 17/06 | |
| | | | 434/16 | |
| 7,510,340 B2* | 3/2009 | Laganas | G03B 17/565 | |
| | | | 250/330 | |
| 7,591,780 B2* | 9/2009 | Jacobsen | A61B 1/05 | |
| | | | 257/432 | |
| 7,656,579 B1 | 2/2010 | Millett | | |
| 7,937,880 B1* | 5/2011 | Fidlow | F41A 17/06 | |
| | | | 396/426 | |
| 8,156,679 B1* | 4/2012 | Swan | F41G 11/003 | |
| | | | 33/263 | |
| 2002/0184810 A1* | 12/2002 | Day | F41C 27/00 | |
| | | | 42/79 | |
| 2003/0163943 A1* | 9/2003 | Holmberg | F41C 27/00 | |
| | | | 42/142 | |
| 2003/0222325 A1* | 12/2003 | Jacobsen | A61B 1/05 | |
| | | | 257/432 | |
| 2004/0031184 A1* | 2/2004 | Hope | F41C 27/00 | |
| | | | 42/111 | |
| 2004/0257437 A1 | 12/2004 | Lesseu | | |
| 2005/0179799 A1* | 8/2005 | Umanskiy | F41C 27/00 | |
| | | | 348/333.01 | |
| 2005/0252063 A1* | 11/2005 | Flannigan | F41G 1/38 | |
| | | | 42/119 | |
| 2005/0268521 A1* | 12/2005 | Cox | F41G 1/38 | |
| | | | 42/130 | |
| 2006/0196098 A1 | 9/2006 | Lee et al. | | |
| 2006/0201047 A1* | 9/2006 | Lowrey, III | F41C 27/22 | |
| | | | 42/122 | |
| 2006/0230665 A1* | 10/2006 | Narcy | G02B 23/12 | |
| | | | 42/123 | |
| 2007/0157502 A1* | 7/2007 | Holmberg | F41G 11/003 | |
| | | | 42/124 | |
| 2007/0223087 A1* | 9/2007 | Pochapsky | F41G 3/165 | |
| | | | 359/359 | |
| 2008/0066362 A1* | 3/2008 | Fidlow | F41A 17/06 | |
| | | | 42/90 | |
| 2010/0313461 A1* | 12/2010 | Holmberg | F41C 27/00 | |
| | | | 42/90 | |
| 2010/0313462 A1* | 12/2010 | Holmberg | F41C 27/00 | |
| | | | 42/124 | |
| 2011/0030544 A1* | 2/2011 | Hodge | F41A 27/06 | |
| | | | 89/41.05 | |
| 2011/0085791 A1* | 4/2011 | Laganas | G03B 17/566 | |
| | | | 396/530 | |
| 2011/0308130 A1* | 12/2011 | Holmberg | F41G 1/32 | |
| | | | 42/90 | |
| 2012/0030985 A1* | 2/2012 | Mauricio | F41G 1/38 | |
| | | | 42/84 | |
| 2012/0240444 A1* | 9/2012 | Russell | F41C 27/00 | |
| | | | 42/90 | |
| 2012/0297658 A1* | 11/2012 | Lupher | F41A 17/06 | |
| | | | 42/69.01 | |

\* cited by examiner

VIEWING APPARATUS

CROSS REFERENCE TO RELATED APPLICATIONS

The present application is a continuation of U.S. application Ser. No. 13/509,777, which is the National Stage of International Application No. PCT/GB2011/051031, filed Jun. 1, 2011, which in turn claims priority to Application No. GB1010207.7, filed Jun. 18, 2010, the disclosures of each of which are hereby incorporated by reference herein in their entirety.

The present invention relates to a viewing apparatus for a rifle scope and a rifle scope assembly comprising the viewing apparatus.

Rifle scopes are well known in the art and in their simplest form comprise a scope tube having a magnifying lens toward a first end and an eyepiece at a second end through which a user looks. In use, the tube of the rifle scope is aligned with a barrel of the rifle to allow a user to see, via the eyepiece and lens, a magnified view of where the rifle is aimed, thereby allowing for increased accuracy in shooting the rifle. The scope often comprises a reticle or "crosshairs" to indicate to a user the exact point where the rifle is aimed.

Rifles are often required to be used in conditions of low ambient light. This is particularly the case where the rifle is used for vermin control of predominantly nocturnal animals, such as rats. A more complicated scope assembly, particularly useful in low ambient light situations, may comprise infrared viewing technology, known as "night vision". In such technology, the scope is fitted with an infrared illuminator and an image intensifying tube to intensify the detected infrared light. This allows a user to look down the scope and see an image intensified by the intensifying tube, which appears to a user as an illuminated view of an apparently dark scene.

However, while such a night vision system may be used in conditions of low ambient light, this system has several significant drawbacks. Firstly, such a system is very difficult to install and calibrate on a rifle, not least of all because calibration is required to be undertaken in conditions of high ambient light, which can irreparably damage the intensifying tube. Also, since a user may wish to use the night vision scope alternatively with a conventional ambient light scope, it is necessary to switch rifle scopes, thereby requiring a user to undergo installation and recalibration every time the alternative scope is fitted. A further drawback is that night vision systems are very costly.

It is an object of aspects of the present invention to provide a solution to the above mentioned or other problems.

According to a first aspect of the present invention there is provided a viewing apparatus for a rifle scope, the viewing apparatus comprising a camera unit having a camera and attachment means operable to attach the camera unit to a rifle scope such that the camera is exposed to an image visible at an eyepiece of a rifle scope, the camera being adapted to generate image data from the image to which it is exposed, the camera unit being arranged and operable to transfer the image data from the camera to a display unit, the display unit comprising display means being arranged and operable to display the image data received from the camera unit, the display unit further comprising attachment means operable to attach the display unit to a rifle scope.

Preferably, the attachment means of the camera unit is operable to attach the camera unit over an eyepiece of a rifle scope. Preferably, the attachment means of the camera unit comprises a gaiter operable to fit over an eyepiece of a rifle scope. Preferably, the camera unit comprises a housing unit in which the camera is housed. Preferably, the camera unit is arranged and operable to fit over an eyepiece of a rifle scope such that the camera is aimed down a tube of a rifle scope.

Preferably, the camera is an infrared camera. By the term "infrared camera" it is meant a camera that is sensitive to infrared light.

The camera is preferably arranged and operable to relay an image detected at an eyepiece of a rifle scope to the display unit. Preferably, the camera is operable to generate dynamic image data. In other words, preferably the image data is not static imagery, but a live feed of moving imagery viewed by the camera.

Preferably, the viewing apparatus comprises means to allow the image data to be recorded by an image recording device. The means may comprise an interface which may be a wired or wireless interface. The interface may comprise a socket into which a recording device may be plugged. The socket may be a 3.5 mm jack socket, for example. Accordingly, in one embodiment, the viewing apparatus comprises a video output socket. The means to allow the image data to be recorded by an image recording device may be situated on the camera unit or the display unit. The means to allow the image data to be recorded by an image recording device is operable to allow the output of dynamic image data.

Preferably, the display unit comprises a screen.

Preferably, the attachment means of the display unit is arranged to allow attachment of the display unit above a rifle scope in use, preferably above a scope tube thereof, preferably toward an end thereof distal to an eyepiece.

Preferably, the viewing apparatus further comprises illumination means. The illumination means may comprise infrared illumination means. The illumination means may comprise a plurality of infrared emitting bulbs.

By the term "infrared illumination means" it is meant a device operable to emit infrared light.

In one embodiment, the illumination means may be integral with the display unit. Preferably, the illumination means is housed in the display unit, preferably in a face thereof, which face is preferably generally opposite a face in which the screen is housed.

The viewing apparatus may comprise illumination varying means, operable to vary the intensity of the illumination means, in use. The illumination varying means may be continuously or discretely variable.

In one embodiment, the illumination varying means may be discretely variable between a plurality of predetermined intensities. One of the predetermined intensities may be zero, wherein the illumination means is in an "off" state.

The viewing apparatus may comprise means to switch the screen of the display unit between an "on" position and an "off" position.

In one embodiment, the means to switch the screen of the display unit between an "on" position and an "off" position may be combined with the illumination varying means. In such an embodiment, the means may comprise a plurality of discrete positions. The means may comprise a rotatable dial, for example. In such an embodiment, the means may comprise a number of discrete modes, as follows: i) screen off, illumination means off; ii) screen on, illumination means off; iii) screen on, illumination means on at a first predetermined intensity; iv) screen on, illumination means on at a second predetermined intensity; etc.

The illumination means may be operable to illuminate to a predetermined distance, depending on the use of the viewing apparatus. For example, in one embodiment, for a rifle that is designed to shoot a target at about 50 yards, the illumination means may be operable to illuminate to a position about 50 yards away. However, in alternative embodiment, the rifle may be designed to shoot a target at about 200 yards, in which case, the illumination means may be operable to illuminate to a position about 200 yards away.

The viewing apparatus may further comprise a power supply, preferably operable to supply power to the camera unit and/or display unit. The power supply may comprise a 12V DC power supply.

According to a second aspect of the present invention there is provided a rifle scope assembly comprising a rifle scope having a scope tube comprising an eyepiece, the assembly further comprising a viewing apparatus having a camera unit comprising a camera, the camera unit being attached to the rifle scope via attachment means such that the camera is exposed to an image visible at the eyepiece of the rifle scope, the camera being adapted to generate image data from the image to which is exposed, the camera unit being arranged and operable to transfer the image data from the camera to the display unit, the assembly further comprising a display unit being attached to the rifle scope via attachment means, the display unit comprising display means being arranged and operable to display the image data received from the camera unit.

According to a further aspect of the present invention, there is provided a method of shooting a rifle, the method comprising using image data displayed on display means of a display unit, the display unit being attached to a rifle scope via attachment means, the image data being transferred to the display unit from a camera unit, the camera unit comprising a camera, the camera unit being attached to the rifle scope via attachment means such that the camera is exposed to an image visible at an eyepiece of the rifle scope, the image data being generated by the camera.

According to a further aspect of the present invention there is provided a viewing apparatus kit comprising a camera unit having a camera and attachment means, the attachment means being operable to attach the camera unit to a rifle scope such that the camera is exposed to an image visible at an eyepiece of a rifle scope; the kit further comprising a display unit comprising display means and attachment means operable to attach the display unit to a rifle scope.

The present invention also extends to a rifle fitted with a viewing apparatus or a rifle scope assembly of the first or second aspect. The rifle is preferably an air rifle.

The present inventors have also invented a hand held viewing device, which can be used when accompanying a rifle holder for identifying targets, or in other arenas of security and covert viewing.

Therefore, according to a further aspect of the present invention there is provided a hand held viewing device comprising a housing, the housing comprising a camera unit, a display unit and infrared illumination means, the display unit being operable to display image data detected by the camera unit, the device further comprising a handle to thereby allow the device to be hand held, in use.

Preferably, the camera unit and the display unit are arranged on different faces of the housing, preferably substantially opposite faces of the housing.

Preferably, the infrared illumination means are arranged and operable to illuminate an area with infrared light.

Preferably, the camera unit comprises a camera that is preferably operable to detect infrared light.

Features of the viewing apparatus described above in relation to the first aspect may be combined with the viewing device of the present aspect.

All of the features contained herein may be combined with any of the above aspects and in any combination.

For a better understanding of the invention, and to show how embodiments of the same may be carried into effect, reference will now be made, by way of example, to the accompanying diagrammatic drawings in which.

Figure 1:
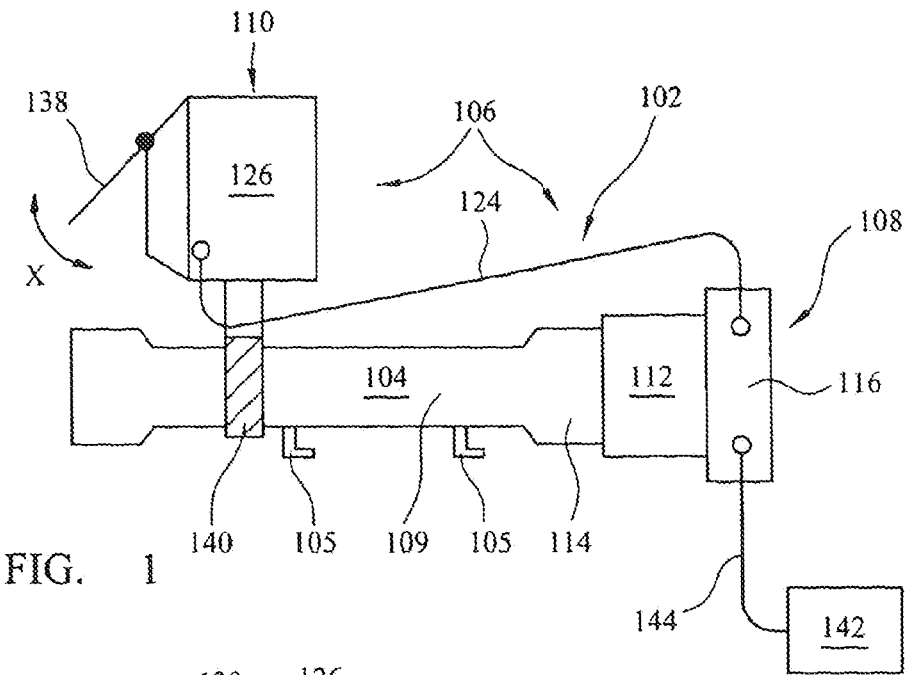
FIG. 1 shows a schematic view of a rifle scope assembly.

Referring firstly to FIG. 1 there is shown a rifle scope assembly 102 comprising a rifle scope 104 known in the art, fitted with a viewing apparatus 106 of the invention. The viewing apparatus 106 comprises a camera unit 108 fitted to an end of the rifle scope 104 and a display unit 110 fitted above a tube 109 of the scope 104. The rifle scope 104 comprises securing means 105 operable to allow it to be secured to the barrel of a rifle (not shown).

Figure 2:
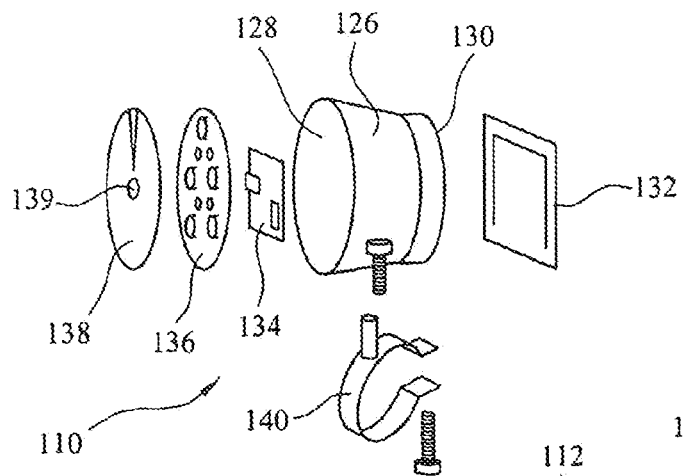
FIG. 2 shows an exploded view of a display unit of a viewing apparatus.
Figure 3:
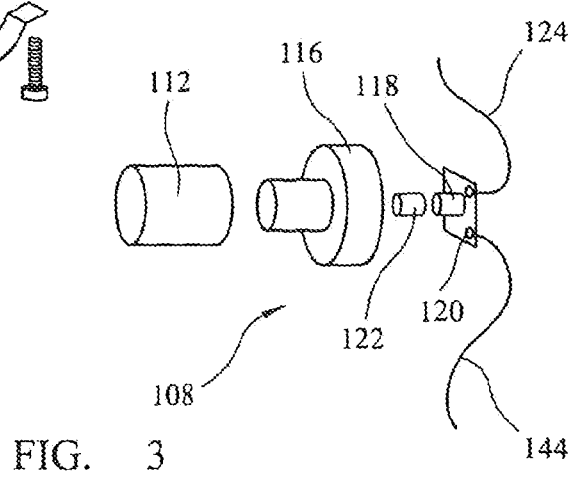
FIG. 3 shows a schematic exploded view of a camera unit of a viewing apparatus.

In more detail and referring now also to FIGS. 2 and 3, the camera unit 108 comprises a cylindrical attachment gaiter 112, which is fitted over an eyepiece 114 of the scope 104. At a rear side of the attachment gaiter 112, distal to the eyepiece 114, is a camera housing 116. The camera housing 116 is generally circular in cross section and houses a camera board 120 and a camera board lens inside an alignment tube 122 at a central point thereof such that, in the arrangement shown in FIG. 1, the camera lens 118 is aligned coaxially with a longitudinal axis of the scope 104. In this manner, the camera lens 118 points down the length of the scope 104 and is arranged to detect the view that a user would see when looking down the eyepiece 114 of the scope 104.

The camera unit 108 communicates data received by the camera (the view from the eyepiece) to the display unit 110 via a cable 124. However, it will be appreciated that such communication could be wireless. Also, power is transmitted from the camera unit 108 to the display unit 106 via the cable 124.

Referring now to FIG. 2, the display unit 110 comprises a housing 126 having a circular aperture 128 on one face and a generally rectangular aperture 130 on an opposite face. Into the rectangular aperture 130 is fitted a display screen 132. In a preferred embodiment, the display screen 132 comprises an LCD screen, such as a 3.5 inch LCD colour screen. Into the circular aperture 128 is fitted an illuminator circuit board 134, an illuminator device 136 and a cover 138. The illuminator device 136 comprises a plurality of infrared emitting LEDs. The cover 138 is hingably attached to a rim of the circular aperture 128, and operable to move between an open and closed position as indicated by the arrow "X" in FIG. 1. The cover 138 has a small central aperture 139. The display unit 110 is attached above the rifle scope 104 by a clip 140.

The illuminator circuit board 134 comprises a photo cell thereon which is operable to detect the ambient light conditions and switch the illumination device 136 on (in low ambient light conditions) and off (in high ambient light conditions).

The scope assembly 102 also comprises a power source 142 in the form of a battery, which in the present embodiment is a separate unit attached to the camera unit 108 via a power cable 144. In the present embodiment, the power supply 142 is a 12V DC battery having a belt clip to allow a user to attach the device to their belt.

In use, the viewing apparatus operates as follows. A user attaches the viewing apparatus 106 to the scope 104 of their rifle (not shown) by fitting the gaiter 112 of the camera unit 108 over the eyepiece of the rifle scope 104 and attaching the display unit 110 onto the scope 104 at a position above a scope tube of the scope and toward an end thereof distal to the eyepiece. The power supply 142 is attached to the camera unit 108 via cable 144, and cable 124 is attached between the camera unit and the display unit.

The camera 118 is exposed to and detects the view through the eyepiece, which it relays via cable 124 to the display unit 110 and the image produced by the camera 118 is reproduced on the screen 132. In this manner, the user is shown on the display screen 132 what is visible through the eyepiece 114 of the scope 104. However, the camera 118 is an infrared camera, and is therefore operable in low light conditions to provide an improved picture to that visible to the naked eye. Furthermore, in very low light conditions, the illuminator 136 is activated via the photo cell discussed above thus causing infrared light to be emitted, which provides an improved image to the camera (because the camera is able to detect the emitted infrared light). Depending on the ambient light conditions, the cover 138 may be raised or lowered thereby allowing light to exit only by the aperture 139 or entirely by removing the obstacle of the cover 138.

A viewing apparatus according to the present invention has the advantage that it allows a user to view where the rifle is aimed without the need to look down the rifle scope. Furthermore, because the camera is infrared, the device can operate in low light conditions. The provision of an infrared illuminator provides for a yet further advantage in that the viewing device can be used in conditions of very low ambient light.

A further particular advantage of the viewing apparatus of the present invention is that it can be retrofitted to an existing rifle scope, thus a user can choose to add the viewing device to their existing scope when required, or shoot without the device in other scenarios. Also, because the camera is arranged to view what a user would see through the eyepiece of the scope of display this view on a display unit, the system has the advantage that the user sees the reticule visible through the scope, which provides for improved accuracy in shooting. Also, the viewing apparatus has the advantage that it does not require a change to the day set-up of a user's rifle scope.

Figure 4:
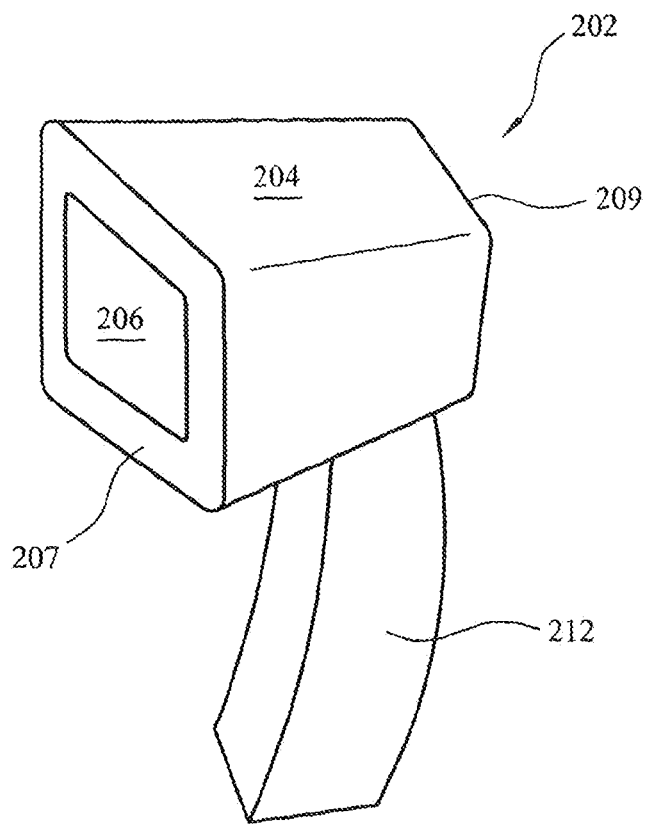
FIG. 4 shows a schematic perspective view of a hand held viewing device according to the invention.
Figure 5:
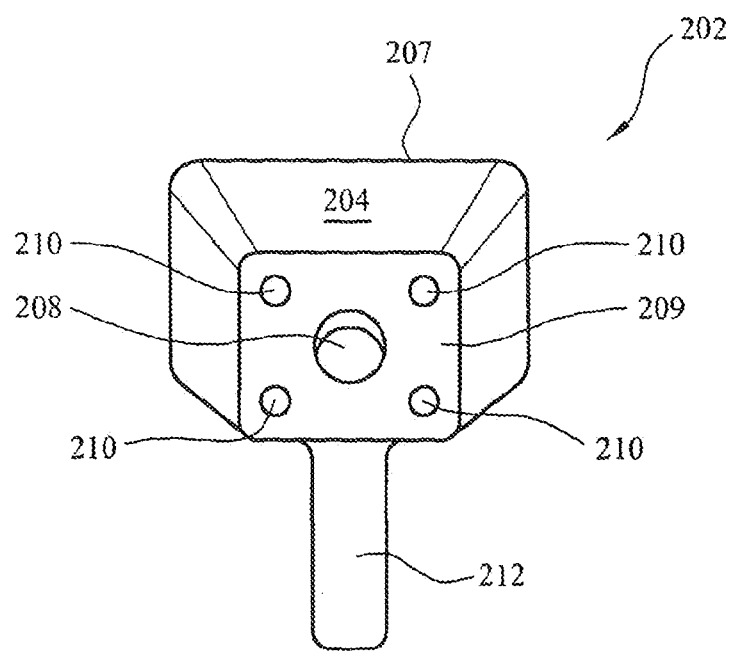
FIG. 5 shows a schematic front view of a hand held viewing device according to the invention.

Referring now to FIGS. 4 and 5 there is shown a hand held viewing device 202 according to a further aspect of the present invention. The device 202 comprises a housing 204 which comprises a screen 206 on a first face 207 thereof and a camera 208 on a second face 209 thereof, the second face 209 being substantially opposite the first face 207. The screen is operable to produce an image detected by the camera.

As shown in FIG. 5, surrounding the camera 208 are a number of infrared bulbs 210. Extending downward from the housing 204 is a handle 212.

In use, a user holds the device 202 by gripping the handle 212. The user then points the camera 208 at an area to be viewed, thereby causing an image of the area to be displayed on the screen 206. The infrared bulbs 210 may illuminate the area to be viewed infrared light, which is not perceptible to the human eye, but which can be detected by the camera 208 and shown on the screen 206. This allows an area to be viewed by a user without alerting the target. This is useful when spotting targets, for example vermin, if accompanying a rifle holder. Alternatively, such a device is useful in the security industry where it can be used to allow a user to see into dark areas, without illuminating the areas in a way that is perceptible to the human eye.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of using a viewing apparatus on a rifle scope for aiming a rifle at a target, the method comprising:
   retrofitting the rifle scope while the rifle scope is already attached to the rifle and has been used for aiming the rifle, the retrofitting comprising attaching a camera to a first end of the rifle scope and aligning the camera with a longitudinal axis of the rifle scope;
   attaching a display screen to the rifle scope away from the first end and positioning the display screen away from the longitudinal axis of the rifle scope with the display screen facing towards the first end of the rifle scope;
   attaching an illumination unit to the rifle scope away from the first end and between the display screen and a second end of the rifle scope, the illumination unit comprising light emitting elements, the display screen and the illumination unit extending from the rifle scope such that the display screen is visible from the first end of the rifle scope;
   illuminating the target with infrared light from the illumination unit and capturing image data that is visible through the rifle scope;
   communicating the image data from the camera to the display unit and displaying the image data that is visible through the rifle scope on the display screen; and
   while in a heads-up shooting position without looking through the rifle scope, visually observing the image data that is displayed on the display screen and aiming the rifle at the target.

2. The method of claim 1, further comprising aiming the rifle while both eyes are open.

3. The method of claim 1, further comprising attaching the camera to the first end of the rifle scope and visually blocking the rifle scope.

4. The method of claim 1, further comprising displaying on the display screen a reticule that is visible through the rifle scope.

5. The method of claim 1, further comprising attaching the display screen to the rifle scope and positioning the display screen above the rifle scope.

6. The method of claim 1, further comprising positioning the display screen and the illumination unit in a common housing.

7. A method of using a viewing apparatus on a rifle scope that is attached to a top of a rifle for aiming, the rifle scope comprising an elongated tube with a first end that faces in a first direction towards the user and an opposing second end that faces in a second direction away from the user, the rifle scope also comprising a magnifying lens within the tube and an eyepiece at the first end, the method comprising:
  looking through the first end of the tube at a magnified version of a first target and aiming the rifle at the first target;
  retrofitting the rifle scope by attaching a camera to the first end of the rifle scope and aligning the camera with a longitudinal axis of the rifle scope thereby preventing a user from looking through the first end of the tube to aim the rifle;
  attaching a display screen to the rifle scope between the first and second ends of the tube;
  positioning the display screen on the rifle scope away from the longitudinal axis of the rifle scope and facing in the first direction;
  attaching an illumination unit to the rifle scope, the illumination unit comprising light emitting elements that face in the second direction;
  illuminating a second target with infrared light that is emitted from the illumination unit; and
  aiming the rifle at the second target by viewing image data that is captured by the camera and displayed on the display screen without looking through the first end of the tube.

8. The method of claim 7, further comprising positioning the display screen above the rifle scope and farther from the top of the rifle than the rifle scope.

9. The method of claim 7, further comprising positioning the camera and the display screen on the rifle scope such that neither extends outward beyond the second end of the rifle scope towards an output end of a barrel of the rifle.

10. The method of claim 7, further comprising positioning the camera over the first end of the rifle scope and blocking a view through the rifle scope.

11. The method of claim 7, further comprising positioning the display screen and the illumination unit in a common housing.

12. The method of claim 7, wherein the first and second targets are the same.

13. A method of using a viewing apparatus on a rifle scope that is attached to a rifle for aiming, the rifle scope comprising an elongated tube with a first end that faces in a first direction towards the user and an opposing second end that faces in a second direction away from the user, the rifle scope also comprising a magnifying lens within the tube and an eyepiece at the first end, the method comprising:
  retrofitting the rifle scope by attaching a camera to the first end of the rifle scope and aligning the camera with a longitudinal axis of the rifle scope thereby preventing a user from looking through the first end of the tube to aim the rifle;
  attaching a display screen to the rifle scope between the first and second ends of the tube and a away from a barrel of the rifle;
  facing the display screen in the first direction;
  attaching an illumination unit that comprises light emitting elements to the rifle scope, the illumination unit positioned between the display screen and the second end of the rifle scope with the light emitting elements facing in the second direction and with the display screen and the illumination unit extending outward from the rifle scope and with the display screen visible from the first end of the rifle scope;
  illuminating a target with infrared light that is emitted from the illumination unit; and
  assuming a heads-up orientation and viewing image data that is captured by the camera and being displayed on the display screen without looking through the first end of the tube and aiming the rifle at the target.

14. The method of claim 13, further comprising positioning the display screen and the illumination unit in a common housing.

* * * * *